United States Patent [19]

Henmi

[11] Patent Number: 5,227,908
[45] Date of Patent: Jul. 13, 1993

[54] OPTICAL COMMUNICATION APPARATUS USING INTENSITY MODULATION

[75] Inventor: Naoya Henmi, Tokyo, Japan

[73] Assignee: NEC Corporation, Tokyo, Japan

[21] Appl. No.: 729,754

[22] Filed: Jul. 15, 1991

[30] Foreign Application Priority Data

Jul. 13, 1990 [JP] Japan ................................ 2-186331

[51] Int. Cl.⁵ ............................................ H04B 10/00
[52] U.S. Cl. .................................... 359/154; 359/173; 359/181; 372/26
[58] Field of Search ............... 359/154, 161, 162, 173, 359/181, 188, 195; 372/26, 31

[56] References Cited

U.S. PATENT DOCUMENTS 3,020,398  2/1962  Hyde ................................... 359/162

FOREIGN PATENT DOCUMENTS 2083964  3/1982  United Kingdom ................. 359/154

OTHER PUBLICATIONS

M. Shikada et al, "Long-Distance Gigabit-Range Optical Fiber . . . " Journal of Lightwave Technology, vol. LT-5, No. 10, Oct. 1987, pp. 1488-1497.

S. Yamamoto et al, "516km, 2.4Gbit/s Optical Fiber Transmission Experiment using 10 . . . " IOOC '89 Technical Digest, vol. 5, Jul. 18-21, 1989, pp. 27-29.

S. K. Korotky et al, "8-Gbit/s Transmission Experiment over 68 km of Optical Fiber . . . " Journal of Lightwave Technology, vol. LT-5, No. 10, Oct. 1987, pp. 1505-1509.

A. H. Gnauck et al, "Optical Equivalization of Fiber Chromatic Dispersion in . . . " OFC '90, Optical Fiber Communication Conference, Jan. 22-26, 1990, pp. PD7-1-PD7-4.

Y. Yamamoto et al, "Coherent Optical Fiber Transmission Systems", IEEE Journal of Quantum Electronics, vol. QE-17, No. 6, Jun. 1981, pp. 919-935.

*Primary Examiner*—Edward L. Coles, Sr.
*Assistant Examiner*—Kinfe-Michael Negash
*Attorney, Agent, or Firm*—Sughrue, Mion, Zinn, Macpeak & Seas

[57] ABSTRACT

A transmitter unit (100) including a semiconductor laser (101) as a carrier light exciting source, a biasing source (102) for providing the semiconductor laser with a d.c. biasing current, an external modulator (105) for intensity-modulating an output light of the semiconductor laser according to a transmission signal, and means (107; 210; 510; 701, 702, 703, 704) for causing the external modulator to output only the carrier light and either side-band light. Also provided is a receiver unit (150) including a receiver (151) for square-law detecting the carrier light and the side-band light supplied from the transmitter unit to obtain an electric signal, and a linear filter (152) for equalizing this electric signal. The present invention results in an optical communication apparatus capable of easily equalizing dispersion distortion caused in a transmission path (115) having a large dispersion from a light-intensity modulated light signal transmitted therethrough.

9 Claims, 3 Drawing Sheets

OPTICAL COMMUNICATION APPARATUS USING INTENSITY MODULATION

BACKGROUND OF THE INVENTION

The present invention relates to an optical communication apparatus using intensity-modulation and, particularly, to an optical communication apparatus in which a received signal can be easily equalized on a receiver side.

In an optical communication system, an intensity modulation-direct detection communication apparatus, in which an intensity modulated signal obtained by modulating an injection current to a semiconductor laser with a signal source is transmitted through a transmission line, an optical fiber, and received by an optical receiver using an opto-electric conversion element such as PIN diode, etc., has been used mainly. In such communication apparatus, it has been known that, when a communication is performed in the low-loss region around a wavelength of 1.5 $\mu$m in which optical fiber loss becomes a minimum, a considerable signal quality degradation occurs during propagation through an optical fiber due to chromatic dispersion at a transmission rate of a G bit/s or higher (cf. M. Shikada et al. "Long-distance Gigabit-Range Optical Fiber Transmission Experiments Employing DFB-LD's and InGaAs-APD's", IEEE, Journal of Lightwave Technology, Vol. LT-5, No. 10, October 1987, pp. 1488-1497). Therefore, a transmission using an external modulator has been considered recently to reduce an amount of spectral broadening of a modulated signal light (cf. S. K. Korotky et al. "8-Gb/s Transmission Experiment over 68 km of Optical Fiber using a Ti:LiNbO$_3$ External Modulator", IEEE, Journal Lightwave Technology, Vol. LT-5, No. 10, October 1987, pp. 1505-1509).

In an optical transmitter using such an external modulator, a band width for signal transmission is very small as compared with that of direct modulation. Therefore, it becomes easy to realize a high density wavelength multiplexing or high density frequency multiplexing. Thus, a further development of this technique is expected.

Further, an optical amplifier has been developed, and a non-repeated cascaded amplifier system using such an optical amplifier is being studied (cf. S. Yamamoto et al. "516 km 2.4 Gb/s Optical Fiber Transmission Experiment using 10 Semiconductor Laser Amplifiers and Measurement of Jitter Accumulation", 17th Conference on Integrated Optics and Optical Fiber Communication, Post-deadline Papers 20 PDA-9). In such non-repeated cascaded amplifier systems, in which a span length can be extended by compensating for signal loss, there is a possibility of ultra long distance transmission. Further, in such ultra long distance transmission, distortion of receiving signal waveforms due to optical fiber dispersion is a major factor limiting the distance over which such a transmission is possible.

In a micro wave communication, such waveform distortion occuring after transmission, in which a signal is directly detected by field intensity and frequency of a carrier can be equalized by using a suitable filter after reception.

In the optical communication system, however, an envelope of optical electric field intensity is squared on a receiving side, and only an intensity component thereof is received as an electric signal, and frequency and phase components of the optical electric field are missing. On the other hand, it is known that, due to a chromatic dispersion characteristic of a transmission path, distortion to be applied to the signal is different on an upper side-band and a lower side-band, but these frequency and phase components are missing in the optical communication. Therefore, the distortion characteristics of an electric signal are so complicated that it becomes very difficult to be compensated by a conventional equalizer.

This will be described in more detail below.

An electric field E(t) of light obtained by intensity-modulating laser light with transmission signal a(t) is represented by:

$$E(t) = [1 + a(t)] \cos 2\pi ft \qquad (1)$$

f: carrier frequency

A Fourier expansion of the transmission signal a(t) becomes as follows:

$$a(t) = \sum_n a_n \cos 2\pi n f_0 t + \sum_n a_n' \sin 2\pi n f_0 t$$

where,
n: integer
$f_0$: transmission rate of transmission signal

The equation (1) becomes:

$$E(t) = \left[ 1 + \sum_n a_n \cos 2\pi n f_0 t + \sum_n a_n' \sin 2\pi n f_0 t \right] \cos 2\pi ft \qquad (2)$$

$$= \cos 2\pi ft + \frac{1}{2} \sum_n a_n \cos(2\pi ft + 2\pi n f_0 t) +$$

$$\frac{1}{2} \sum_n a_n' \sin(2\pi ft + 2\pi n f_0 t) +$$

$$\frac{1}{2} \sum_n a_n \cos(2\pi ft - 2\pi n f_0 t) +$$

$$\frac{1}{2} \sum_n a_n' \sin(2\pi ft - 2\pi n f_0 t)$$

In general, in the direct detection, a light intensity obtained by squaring light electric field is received. An intensity component $I_{DB}(t)$ of this signal can be calculated as follows:

$$I_{DB}(t) \approx \frac{1}{2} + \sum_n a_n \cos(2\pi n f_0 t) + \sum_n a_n' \sin(2\pi n f_0 t) = \frac{1}{2} + a(t) \qquad (3)$$

where $a_n' < 1$ and $a_n \cdot a_n' < 1$ are assumed.

Now, it is assumed that such signal represented by the equation (2) propagates along a transmission path such as optical fiber having wavelength dispersion. The electric field E(t) of light after transmission is represented as follows:

$$E(t) = \cos 2\pi ft + \frac{1}{2} \sum_n a_n \cos[2\pi (f + n f_0)t + \Psi(f + n f_0)] + \qquad (4)$$

$$\frac{1}{2} \sum_n a_n' \sin[2\pi (f + n f_0)t + \Psi(f + n f_0)] +$$

$$\frac{1}{2} \sum_n a_n \cos[2\pi (f - n f_0)t + \Psi(f - n f_0)] -$$

$$\frac{1}{2} \sum_n a_n' \sin[2\pi(f - nf_o)t + \Psi(f - nf_o)]$$

The intensity component $I_{DA}(t)$ obtained by square-law detection of the field $E(t)$ is as follows:

$$I_{DA}(t) = \frac{1}{2} \sum_n a_n \cos[2\pi nf_o t + \Psi(f + nf_o)] + \qquad (5)$$

$$\sum_n a_n' \sin(2\pi nf_o t + \Psi(f + nf_o)) +$$

$$\sum_n a_n \cos(2\pi nf_o t - \Psi(f - nf_o)) +$$

$$\sum_n a_n' \sin(2\pi nf_o t + \Psi(f - nf_o))$$

The phase delays $\Psi(f+nf_o)$, $\Psi(f-nf_o)$ of the equation (5) are sources of waveform distortion after transmission.

An equalization of the intensity-modulated component received to the intensity signal of an original signal before transmission will be considered next. It is clear from the equation (5) that the phase delay of the component $\Psi(f+nf_o)$ having the frequency $nf_o$ in the second term and third term is reversed in direction with respect to that of the component $-\Psi(f-nf_o)$ having the same frequency in the fourth and fifth term. This means that, in $I_{DA}(t)$, the phase delay distortion $\Psi(f-nf_o)$ occurred in the lower side-band is coverted to a phase advance distortion $-\Psi(f-nf_o)$ in the received intensity-modulated component and that the phase delay distortion $\Psi(f+nf_o)$ occurred in the upper side-band appears in $I_{DA}(t)$ as it is. That is, in order to equalize the received signal of the equation (5), it is necessary to simultaneously equalize the phase delay distortion $\Psi(f+nf_o)$ and the phase advance distortion $-\Psi(f-nf_o)$. This necessity causes an equalization of the received signal in the equation (5) by means of a conventional linear filter to be very difficult.

In order to solve this problem, Gnauck et al. have proposed a system in which dispersion is compensated by inserting a optical filter suitable in a light signal frequency range into a front portion of a receiver (cf. A. H. Gnauck et al. "Optical Equalization of Fiber Chromatic Dispersion in 5-Gb/s Transmission System", 1990 Optical Fiber Communication Conference, Post deadline paper, PD7"). However, this system is still not effectively used since it is very difficult to make the characteristics of an optical filter equal to a reversal of the dispersion characteristics of a transmission path.

SUMMARY OF THE INVENTION

An object of the present invention is to provide an optical communication apparatus which is capable of equalizing a distortion of an optical signal even after the latter is demodulated to an electric signal on a receiver side of an intensity-modulation optical communication system using an optical fiber having large chromatic dispersion.

According to the present invention, an optical communication apparatus includes a transmitter unit producing a single side-band signal based on a carrier light and a transmitting signal and a receiver unit for receiving the single side-band signal and reproducing the transmitting signal therefrom, wherein the transmitter unit comprises:

carrier producing means for producing the carrier light;

amplitude modulation means for amplitude-modulating the carrier light with the transmitting signal to produce a double side-band signal; and transmitting means for extracting from the double side-band signal a carrier light component and one side-band component and sending them to the transmission path, and wherein the receiver unit comprises:

means for producing an electric signal from the carrier light component and the one side-band light component both supplied from the transmission path; and equalizer means for equalizing the electric signal to reproduce the transmitting signal.

DESCRIPTION OF THE PREFERRED EMBODIMENTS

In the present invention, it is possible, in a transmitter side, to transmit a single side-band light component and a carrier light component to a transmission path such as an optical fiber having large dispersion characteristics and, in a receiver side, to equalize an electric signal after being square-law detected by a light receiving element by means of a linear filter.

When, in the transmitter side, an optical signal whose lower side-band is removed is supplied to the optical fiber, the electric field $E(t)$ of light in the transmission path becomes as follows according to the equation (4):

$$E(t) = \cos 2\pi ft + \frac{1}{2} \sum_n a_n \cos[2\pi(f + nf_o)t + \Psi(f + nf_o)] + \qquad (6)$$

$$\frac{1}{2} \sum_n a_n' \sin[2\pi(f + nf_o)t + \Psi(f + nf_o)]$$

The electric signal $I_{DA}(t)$ obtained by square-law detection of this field by the light receiving element becomes as follow:

$$I_{DA}(t) = \frac{1}{2} + \frac{1}{2} \sum_n a_n \cos[2\pi nf_o t + \Psi(f + nf_o)] + \qquad (7)$$

$$\frac{1}{2} \sum_n a_n' \sin[2\pi nf_o t + \Psi(f + nf_o)]$$

Since, in this signal, phase delays for respective frequency components have the same sign contrary to the case of the equation (5), it can be easily equalized by means of a linear filter capable of compensating for phase delays of the respective frequency components.

Now, a first embodiment of the present invention will be described with reference to FIG. 1.

Figure 1:
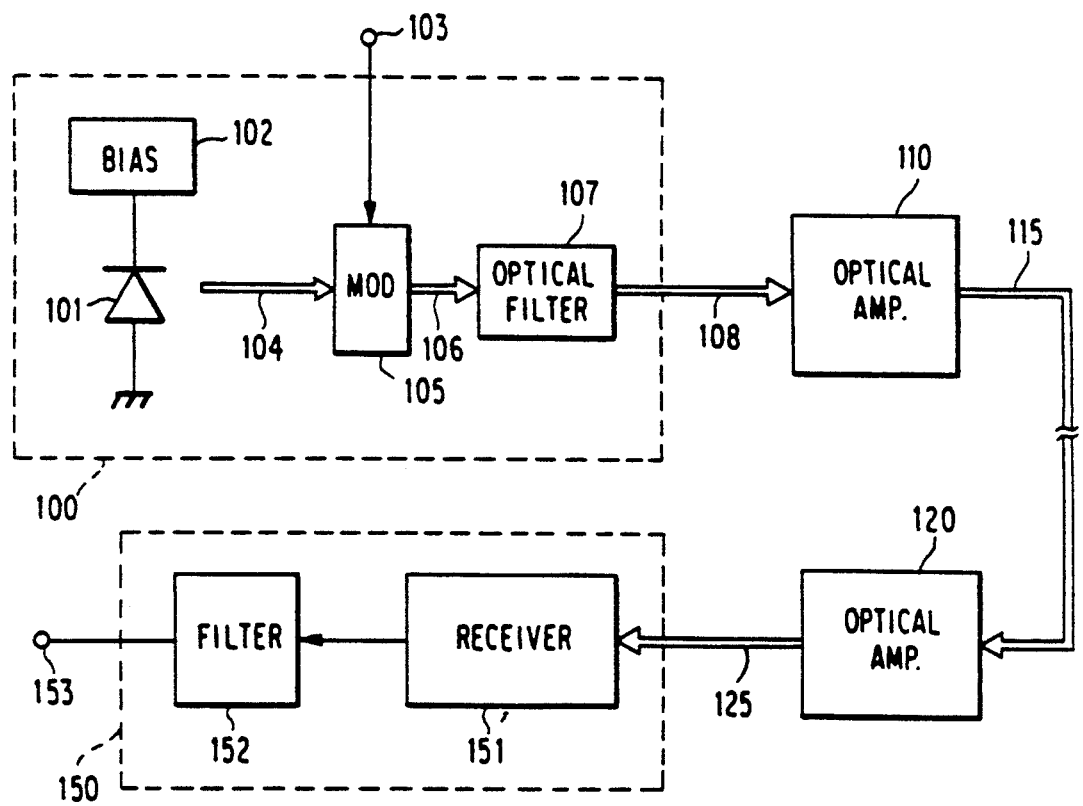
FIG. 1 is a block diagram showing a first embodiment of the present invention.
Figure 2:
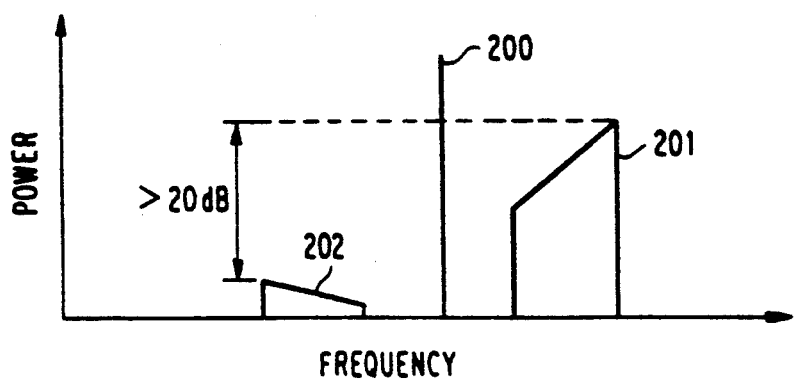
FIG. 2 shows frequency spectrum of an output light from a transmitter portion of the present invention.

In FIG. 1, in a transmitting side 100, a semiconductor laser 101 operable in a single axis mode in an oscillating wavelength range of 1.55 μm oscillates at a carrier light frequency f by a d.c. injection current from a d.c. biasing source 102. An output light 104 of the semiconductor laser 101 is modulated by an external LiNbO$_3$ modulator 105 driven by a transmitting signal inputted from a terminal 103 and, after being passed through an optical filter 107 which serves to suppress the one side-band signal component, the light 106 becomes a transmitting signal light 108. A spectrum analysis of the transmitting signal light 108 by means of a spectrum analyzer showed that a single side-band signal constituted with only one side-band 201 and a carrier wave 200 was obtained as shown in FIG. 2. A suppressed side-band signal 202 is reduced to 20 dB or more with respect to the residual side-band signal 201.

The transmitting signal light 108 was transmitted through ordinary optical fibers 115, 125, etc, whose dispersion is zero in 1.3 μm range. In this case, optical amplifiers 110, 120, etc., were inserted every fixed distance of about 50 km to constitute a non-repeated, 9-cascaded amplifier system over a total distance of 500 km.

The signal transmitted through this 500 km optical path is directly detected by a light receiver 151 and the resultant intensity signal component is equalized by means of an analog linear filter 152 capable of compensating phase delay for each of the frequencies of the signal.

First, both side-band signals were transmitted simultaneously, with the optical filter 107 in the transmitter side 100 being removed. After being propagated through the optical path, these signals were square-low detected by a light receiver 151 in a receiving side 150. An output signal waveform of the receiver 151 included considerable intersymbol interference, so that it was impossible to discriminate mark and space of the transmitting signal normally. An equalization was performed by regulating the frequency-phase characteristics of the linear filter 152. The result was that it was impossible to equalize it to a waveform similar to that of the transmitting signal 103.

A single side-band signal was produced by inserting the optical filter 107 between the external modulator 105 and the transmission line 108 and was transmitted. An amount of intersymbol interference of the receiving signal received by the optical receiver 151 was small compared with the case where both side-bands were transmitted. However, there was a considerable degradation of sensitivity by 10 dB or more. Then, a waveform equalization was performed by regulating a linear filter 152 to have a characteristic which is the reverse of the dispersion characteristics of the transmission line. The result was that the received waveform became one similar to the transmitting signal 103. The amount of degradation of sensitivity in this case was in the order of 1 dB.

There are various modifications of this invention. For example, the single side-band signal may be produced by other methods than the method using the optical filter 107. For example, one of the side-bands can be suppressed by modulating an injection current to a semiconductor laser source to produce a frequency-modulated light from a semiconductor laser and amplitude-modulating the frequency-modulated light with the transmitting signal. Second and third embodiments of the present invention are based on this method.

Before describing the second and third embodiments of the present invention, conditions necessary to suppress one of the side-bands will be described.

Representing a drive signal for causing the semiconductor laser as the carrier light generator to produce the frequency-modulated light as b(t), a signal to be transmitted as a(t), an oscillation frequency of the semiconductor laser when the drive signal b(t) is zero as f, an output signal light of the semiconductor laser is represented by cos $[2\pi ft + \int b(t) dt]$ and, thus, a signal light E(t) obtained by intensity-modulating the output light of the laser is represented by $$E(t) = (1 + a(t)) \cos [2\pi ft + \int b(t) dt] \quad (8)$$

When the phase modulation component $\int b(t)dt$ is small, the following proximations can be obtained:

$$\cos [\int b(t)dt] \approx 1 \text{ and } \sin [\int b(t)dt] \approx \int b(t)dt$$

Further, assuming $a(t) < 1$, the following proximation is obtained:

$$a(t) \sin [\int b(t)dt] \approx 0$$

Therefore, the equation (8) can be proximated by the following equation (9):

$$E(t) = \cos 2\pi ft + a(t)\cos 2\pi ft - [\int b(t)dt] \sin 2\pi ft \quad (9)$$

Fourier expansions of a(t) and b(t) are as follows:

$$a(t) = \sum_n a_n \cos 2\pi n f_o t + \sum_n a_n' \sin 2\pi n f_o t \quad (10)$$

$$\Sigma b(t) = \sum_n b_n \cos(2\pi n f_o t + \phi_n) + \sum_n b_n' \sin(2\pi n f_o t + \phi_n)$$

where n:integer, $a_n$, $a_n'$, $b_n$ and $b_n'$: Fourier coefficient, $\phi_n$: phase, and $f_o$: transmission rate frequency of transmission signal.

Putting the equation (10) into the equation (9), the following equation is obtained:

$$E(t) = \cos 2\pi ft + \sum_n \frac{a_n}{2} \cos[2\pi(f + nf_o)t] + \quad (11)$$

$$\sum_n \frac{a_n'}{2} \sin[2\pi(f + nf_o)t] +$$

$$\sum_n \frac{b_n}{2} \sin[2\pi(f + nf_o)t + \phi_n] - \sum_n \frac{b_n'}{2} \cos[2\pi(f + nf_o)t + \phi_n] +$$

$$\sum_n \frac{a_n}{2} \cos[2\pi(f - nf_o)t] - \sum_n \frac{a_n'}{2} \cos[2\pi(f - f_o)t] +$$

$$\sum_n \frac{b_n}{2} \cos[2\pi(f - nf_o)t - \phi_n] + \sum_n \frac{b_n'}{2} \cos[2\pi(f - nf_o)t - \phi_n]$$

The first term of the right side of the equation (11) indicates the carrier wave component f, the terms 2 to 5 the upper side-band components $f+f_o$, $f+2f_o$, ..., $f+nf_o$ ... and the terms 6 to 9 the lower side-band components $f-f_o$, $f-2f_o$, ..., $f-nf_o$, ...

Assuming $\phi_n = \pi/2$, the equation (11) becomes as follows:

$$E(t) = \cos 2\pi ft + \quad (12)$$

$$\sum_n \frac{a_n - b_n}{2} \cos[2\pi(f + nf_o)t] + \sum_n \frac{a_n' - b_n'}{2} \sin[2\pi(f + nf_o)t] +$$

$$\sum_n \frac{a_n + b_n}{2} \cos[2\pi(f - nf_o)t] + \sum_n \frac{a_n' + b_n'}{2} \sin[2\pi(f - nf_o)t]$$

Assuming, further $$\left.\begin{array}{l} a_n = b_n \\ a_n' = b_n' \end{array}\right\} \quad (13)$$

the following equation is obtained $$E(t) = \cos 2\pi ft + \sum_n a_n \cos[2\pi(f - nf_o)t] + \sum_n a_n' \sin[2\pi(f - nf_o)t] \quad (14)$$

The equation (14) means that, by producing a signal b(t) satisfying $\phi_n = \pi/2$ and the condition defined by the equation (13), frequency-modulating the carrier and amplitude-modulating it with a transmission signal a(t), it is possible to produce a signal including only the carrier component f and the lower side-band components $f - f_o, f - 2f_o, \ldots, f - nf_o, \ldots$ Now, relating between the transmission signal a(t) and the drive signal b(t) in the case where the equation (13) and $\phi_n = \pi/2$ will be obtained. Putting the equation (13) and $\phi_n = \pi/2$ into the equation (10), the following is obtained:

$$\int b(t)dt = \sum_n a_n \cos\left[2\pi nft + \frac{\pi}{2}\right] + \sum_n a_n' \sin\left[2\pi f_o t + \frac{\pi}{2}\right] = \quad (15)$$

$$a\left(t + \frac{\pi}{2}\right)$$

From this, it is clear that it is possible to produce the drive signal b(t) from the transmission signal a(t) by differentiating the transmission signal a(t) and advancing phases of respective frequency components by $\pi/2$ respectively, because $$b(t) = \frac{d}{dt} \int b(t)dt.$$

At this time, only the carrier component and the lower side-band components are obtained as shown by the equation (14).

In order to obtain only the carrier component and the upper side-band components $f+f_o, f+2f_o, \ldots, f+nf_o, \ldots$, the same consideration as for the lower side-band components is performed with $\phi_n = -\pi/2$. Thus, the equation (5) includes only the carrier component and the upper side band components as follow:

$$E(t) = \cos 2\pi ft + \quad (16)$$

$$\sum_n a_n \cos[2\pi(f + nf_o)t] + \sum_n a_n' \sin[2\pi(f + nf_o)t]$$

Figure 3:
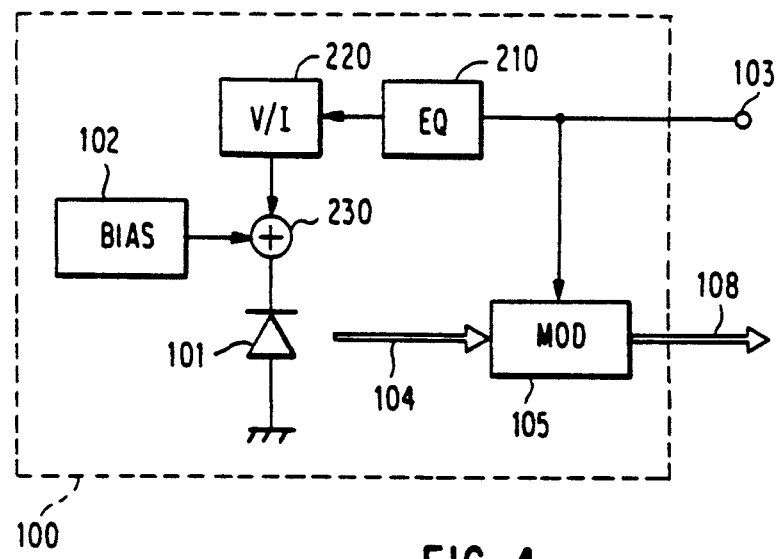
FIG. 3 is a block diagram showing a second embodiment of the present invention.

FIG. 3 shows a construction of a second embodiment of the present invention.

In FIG. 3, a semiconductor laser 101 oscillating in a single axis mode at oscillation wavelength range of 1.55 μm is supplied with a d.c. injection current from a d.c. biasing source 102 through an adder 230. Further, a frequency shift control signal is also supplied to the semiconductor laser 101 from a voltage/current conversion circuit (V/I) 220 through the adder 230. An output light 104 of the semiconductor laser 101 is modulated by an external LiNbO₃ modulator 105 driven by the transmission signal supplied from a terminal 103 and becomes a transmission signal light. The frequency shift control signal is obtained by passing the transmission signal through an equalizer 210 and converting it into a current by means of the voltage/current conversion circuit 220.

As mentioned previously, the lower side-band of the output light signal 108 can be suppressed by differentiating the transmission signal supplied from the terminal 103 and delaying phase $\pi/2$ by the equalizer 210.

Figure 4:
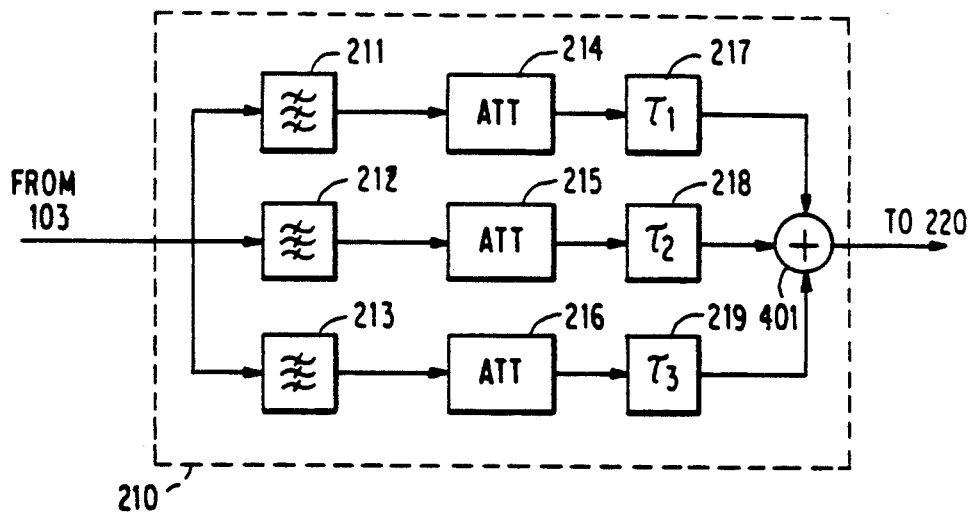
FIG. 4 is a block diagram of an example of an equalizer used in the second embodiment of the present invention.

In this embodiment, the equalizer used may be that shown in FIG. 4. In FIG. 4, a transmission signal having transmitting rate of 5 Gb/s is divided into three ranges by using filters 211, 212 and 213 having pass-bands of 0 to 2 GHz, 2 to 4 GHz and over 4 GHz, respectively. Outputs of the respective filters are supplied to attenuators 214, 215 and 216, respectively. Outputs of the attenuators 214, 215 and 216 are supplied to delay circuits 217, 218 and 219, respectively. Amounts of delay of these delay circuits 217, 218 and 219 are set such that they give phase differences of $\pi/2$ at center frequencies of the corresponding filters, respectively. The differentiating characteristics can be proximately realized by regulating attenuations of the attenuators 214, 215 and 216, respectively. As is well known, the frequency shift of a semiconductor laser depends upon not only an intensity of injection current but also a frequency thereof. This fact is disclosed in Yamamoto, et al. "Coherent Optical Fiber Transmission System", IEEE Journal of QUANTUM ELECTRONICS, Vol. QE-17, June 1981.

It is preferable that such equalizer can also compensate for such injection current-frequency shift characteristics.

In this second embodiment of the present invention, the semiconductor laser 101 was supplied with only the d.c. biasing current from the d.c. biasing source 102 and its output light 104 was amplitude-modulated with a random pattern of 5 Gb/s supplied as transmission signal from the terminal 103. The transmission signal 108 was analysed by a spectrum analyser. There were two side-bands symmetrically on both sides of the carrier light.

Then, an output signal of the voltage/current converting circuit 220 was superimposed on the d.c. biasing current to the semiconductor laser 101. The delay amounts of the delay circuits 217, 218 and 219 of the equalizer in FIG. 4 were regulated to $\pi/2$ the center frequencies of the corresponding filters 211, 212 and 213. Further, by finely tuning attenuations of the variable attenuators 214, 215 and 216, a power of one of the side-bands of the transmission signal 108 was suppressed, resulting in such a single side-band signal as shown in FIG. 2 constituted with only the carrier light and the one side-band. The suppressed side-band was lower in power than the residual side-band by 20 dB or more. The attenuations of the attenuators 214, 215 and 216 were 21.5 dB, 10.3 dB and 0.5 dB, respectively. The inventor has found that a difference between this characteristics and the differentiation characteristics is substantially equal to a reverse characteristics of the aforementioned injection current frequency-frequency shift characteristics of the semiconductor laser.

In the second embodiment described with reference to FIGS. 3 and 4, only the lower side-band components are suppressed. As mentioned previously, in the present invention, the upper side-band can be suppressed by frequency shift control signal which is generated by differentiating a transmission signal and advancing phaser $\pi/2$. Since, it is, however, difficult to advance the transmission signal by $\pi/2$, the same effect is obtained by delaying the transmission signal by $\pi/2$ and supplying it to the external modulator 105. By doing so, it is possible to advance the differentiated transmission signal waveform by $\pi/2$. This is a third embodiment of the present invention.

The third embodiment will be described with reference to FIGS. 5 and 6. The third embodiment differs from the second embodiment, in which the equalizer 210 differentiates the transmission signal and shifts phase by $\pi/2$, in that an equalizer 510 shown in FIG. 5 supplies only a differential signal obtained by differentiating a transmission signal to a voltage-current conversion circuit 220 and supplies a delayed transmission signal obtained by delaying the transmission signal by $\pi/2$ to an external modulator 105.

Figure 6:
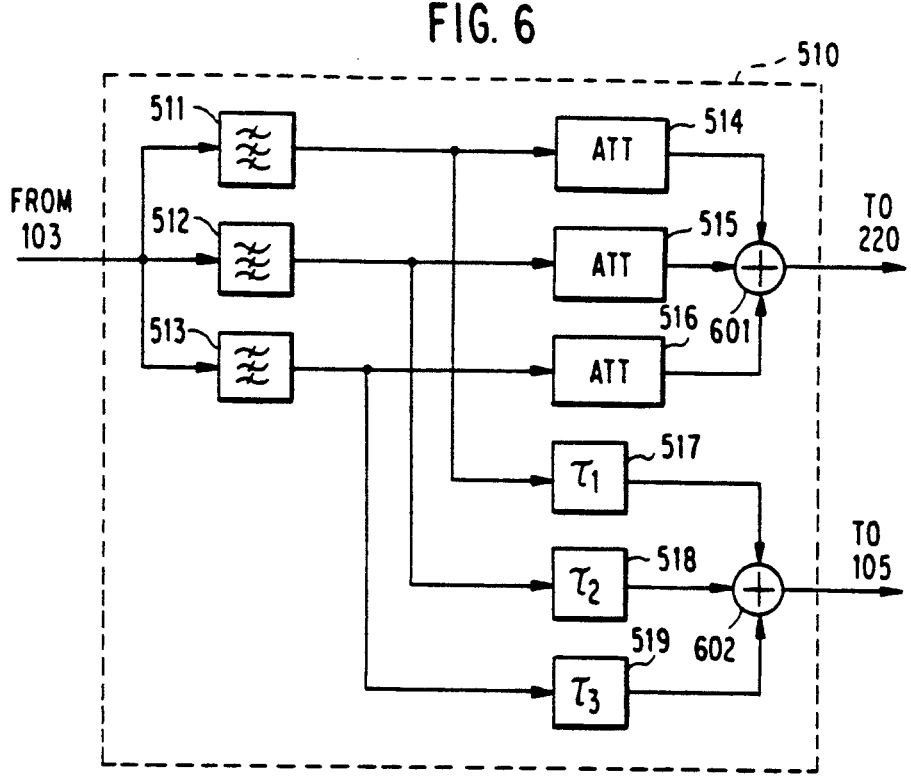
FIG. 6 is a block diagram showing an examplf of an equalizer 10 shown in FIG. 5.

FIG. 6 shows a construction of the equalizer 510. The equalizer 510 is supplied with the transmission signal from a terminal 103. This transmission signal has a transmission rate of 5 Gb/s. This transmission signal is supplied to a low-pass filter 511 whose passband is 0 to 2 GHz, a band-pass filter 512 whose passband is 2 to 4 GHz and a high-pass filter 513 whose pass-band is 4 GHz and higher. Outputs of the filters 511, 512 and 513 are supplied to attenuators 514, 515 and 516 and to delay circuits 517, 518 and 519, respectively.

Attenuations of the attenuators 514, 515 and 516 are the same as those of the attenuators 214, 215 and 216 in FIG. 4, respectively. Delays of the delay circuits 517, 518 and 519 are the same as those of the delay circuits 217, 218 and 219 in FIG. 4, respectively.

Figure 5:
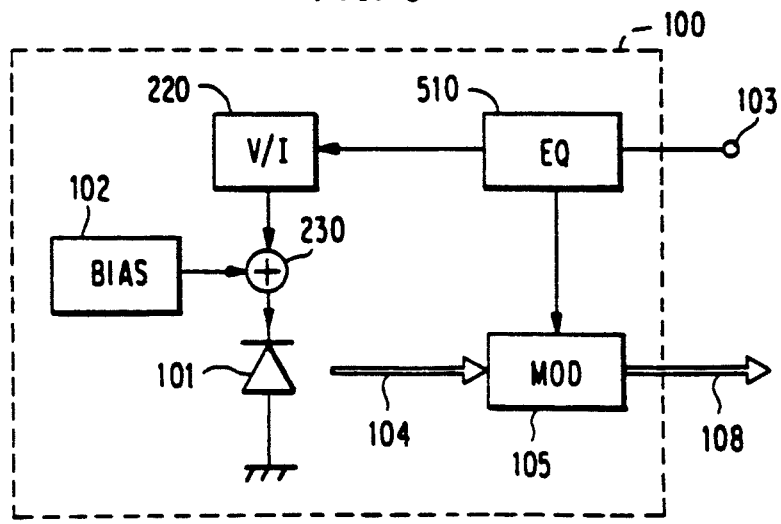
FIG. 5 is a block diagram showing a third embodiment of the present invention.

Outputs of the attenuators 514, 515 and 516 are added to each other in an adder 601 and then supplied to the voltage-current conversion circuit 220 shown in FIG. 5. The outputs of the delay circuits 517, 518 and 519 are added in an adder 602 and supplied to the external modulator 105 shown in FIG. 5. Thus, the differentiated and $\pi/2$ phase delayed transmission signal is supplied to the external modulator 105, resulting in an optical signal whose upper side-band is suppressed.

As a special case of the second or the third embodiments, a case where a transmission signal waveform of a mark signal is a square cosine will be considered. The transmission signal waveform in this case corresponds to that expressed by the equation (10) with $$a_2 = a_3 = \ldots = 0, \ a_1' = a_2' = \ldots = 0$$

and becomes as follow:

$$a(t) = a_1 \cos 2\pi f_0 t \qquad (17)$$

At this time, the equation (15) which is the equation (10) satisfying $\phi_n = \pi/2$ and the condition of the equation (13) becomes as follow:

$$\int b(t) \, dt = a_1 \cos (2f_0 t + \pi/2) \qquad (18)$$

Therefore, the following is obtained $$b(t) = \frac{d}{dt}\left[a_1\left(t + \frac{\pi}{2}\right)\right] \qquad (19)$$

Similarly, for $\phi_n = -\pi/2$, the following is obtained:

$$b(t) = \frac{d}{dt}\left[a_1\left(t - \frac{\pi}{2}\right)\right] \qquad (20)$$

The equations (19) and (20) show that, when the transmission signal waveform of the mark signal is square cosine wave, it is possible to suppress either the upper side-band or lower side-band by supplying a sine wave indicating a timing of the transmission signal, after being regulated in level and phase, to the semiconductor laser as the injection current. Although the above is for a case where the mark signal is continuously outputted, the same explanation is still applicable to a fourth and a fifth embodiment, to be described below since, when the transmission signal is spaced, the external modulator does not output light.

Figure 7:
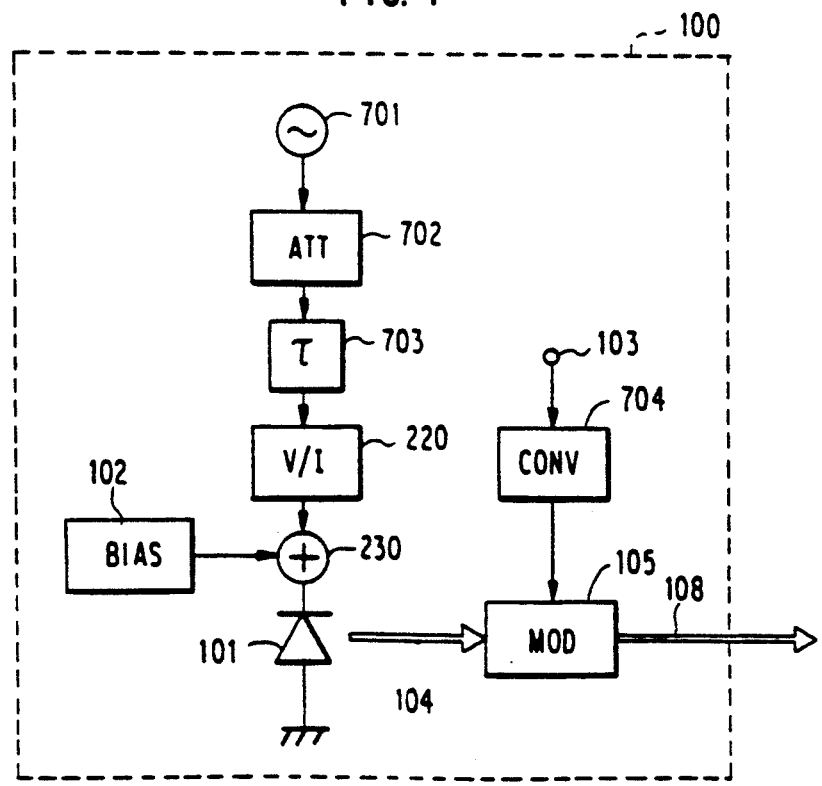
FIG. 7 is a block diagram of a fourth embodiment of the present invention.

FIG. 7 shows the fourth embodiment of the present invention.

In FIG. 7, a d.c. biasing current is supplied through an adder 230 to a semiconductor laser 101. To the adder 230, a frequency shift control signal is supplied from a voltage-current conversion circuit 220. This frequency shift signal is obtained by regulating in amplitude and phase a sine wave having frequency equal to a transmission rate (5 Gb/s) of a transmission signal from a clock source 701 by means of an attenuator 702 and a delay circuit 703. On the other hand, a mark signal of the transmission signal supplied from a terminal 103 is converted by a conversion circuit 704 into a square cosine wave. A space signal thereof is converted into a d.c. value with which the external modulator 105 outputs substantially no light. In order to convert the mark signal into the square sine wave, the conversion circuit 704 may comprises a low-pass filter having cut-off frequency of 70% of the transmission rate frequency. In the fourth embodiment, the lower side-band is thus suppressed.

Similarly to the third embodiment, in order to suppress only an upper side-band, it is possible to delete the delay circuit 703 and instead thereof to insert between the conversion circuit 704 and the external modulator 105 or between the terminal 103 and the conversion circuit 704 a delay circuit whose delay is equal to that of the delay circuit 703. This is a fifth embodiment of the present invention.

Further, in order to suppress the upper side-band, the delay of the delay circuit 703 in FIG. 7 is set to $3\pi/2$, that is, $$\frac{3}{4} \cdot \frac{1}{f_0} \, .$$

An operation or an optical transmitter according to the fourth embodiment will be described.

A biasing current is supplied to a semiconductor laser 101 from a d.c. biasing source 102. In this case, an output signal of a clock signal source 701 was set such that it is not overlapped. An output light 104 of the semiconductor laser 101 and a random pattern of 5 Gb/s from a terminal 103 were directly added to an external modulator 105. A transmission signal light 108 spectrum was analyzed, result of which showed an upper and a lower side-bands symmetrically on both sides of a carrier.

An injection current of the semiconductor laser 101 was modulated by means of the clock signal source 701. It was possible to relatively suppress either of the side-bands by regulating an attenuation of a variable attenuator 702 and a delay of a delay circuit 703. In this case, the level of one side-band signal was suppressed with respect to the other side-band signal by 20 dB or more.

Although, in the fourth embodiment, the clock source 701 supplies a sine wave, it is not limited to that. In fact, it is possible to use a rectangular wave or a triangular wave having the same frequency as the transmission rate of the transmission signal, with substantially the same effect.

Various modifications of the embodiments of the present invention are possible. As to the transmission signal rate, it is not limited to 5 Gb/s, and any rate higher or lower than 5 Gb/s may be used. For example, 10 Gb/s or 2 Gb/s may be used. As the external modulator, a semi-conductor absorption type external modulator may be used. The signal wavelength is not limited to 1.5 µm and 1.3 µm, and other wavelength may be used.

As described in detail, according to the present invention, it is possible to provide an optical communication apparatus capable of equalizing, in a receiving side, a receiving signal which is intensity-modulated, transmitted through a transmission path such as optical fiber having large dispersion and demodulated by a square-law detection in the receiving side.

What is claimed is:

1. An intensity modulation optical communication apparatus including a transmitter unit for producing a single side-band intensity modulated light signal based on a carrier light and a transmission signal, and a receiver unit for receiving the single side-band intensity modulated light signal and reproducing the transmission signal therefrom, wherein said transmitter unit comprises:
   carrier light producing means for producing a carrier light according to a control signal;
   control signal generator means for producing said control signal by phase-shifting said transmission signal by a constant phase angle and emphasizing a high frequency component thereof; and
   amplitude modulation means for amplitude-modulating said carrier light according to said transmission signal to output said single side-band intensity modulated light signal, and wherein the receiver unit comprises:
   means for producing an electric signal by detecting the single side-band intensity modulated light signal; and
   equalizer means for equalizing the electric signal to reproduce the transmission signal.

2. The apparatus claimed in claim 1, wherein said control signal generator means comprises:
   a plurality of filters for dividing a band of said transmission signal to a plurality of sub-bands;
   a plurality of level regulator means connected to said filters, respectively;
   a plurality of delay means for delaying outputs of said level regulator means by an amount corresponding to said constant phase angle at center frequencies of said filters connected to said level regulator means; and
   adder means for adding outputs of said delay means to produce said control signal.

3. The apparatus claimed in claim 1, wherein said control signal generator means comprises:
   a plurality of filters for dividing a band of said transmission signal to a plurality of sub-bands;
   a plurality of level regulator means connected to said filters, respectively; and
   first adder means for adding outputs of said level regulator means to produce said control signal, and wherein said amplitude modulation means comprises;
   a plurality of delay means connected to said plurality of filters respectively, said delay means providing delays corresponding to said constant phase angle at said center frequencies of said filter means connected to said delay means; and
   a second adder means for adding outputs of said delay means, said amplitude modulation means amplitude-modulating said carrier light on the basis of an output of said second adder means.

4. The apparatus claimed in claim 1, wherein said control signal generator means comprises:
   means for producing a periodic signal having the same frequency as a transmission rate of said transmission signal;
   level regulation means for regulating a level of said periodic signal and outputting a level regulated periodic signal; and
   delay means for delaying said level regulated periodic signal by a constant delay amount to produce said control signal, and wherein said amplitude-modulation means comprises:
   conversion means for converting at least a mark signal of said transmission signal into a square-law cosine wave; and
   a modulator for amplitude-modulating said carrier light according to said square-law cosine wave.

5. The apparatus claimed in claim 4, wherein said periodic signal is a sine wave signal.

6. The apparatus claimed in claim 4 or 5, wherein said constant delay amount of said delay means is one fourth of a period of said periodic signal.

7. The apparatus claimed in claim 4 or 5, wherein said constant delay amount of said delay means is three fourths of a period of said periodic signal.

8. The apparatus claimed in claim 1, wherein said control signal generator means comprises:
   means for producing a period signal having the same frequency as a transmission rate of said transmission signal; and
   level regulation means for regulating a level of said period signal and outputting a level regulated period signal as said control signal, and wherein said amplitude-modulation means comprises:
   conversion means for converting at least a mark signal of said transmission signal into a square-law cosine wave;
   delay means for delaying said square-law cosine wave; and
   a modulator for amplitude-modulating said carrier light according to said square-law cosine wave.

9. The apparatus claimed in claim 8, wherein said periodic signal is a sine wave signal.

* * * * *

UNITED STATES PATENT AND TRADEMARK OFFICE
CERTIFICATE OF CORRECTION

PATENT NO. : 5,227,908
DATED : July 13, 1993
INVENTOR(S) : Naoya HENMI It is certified that error appears in the above-identified patent and that said Letters Patent is hereby corrected as shown below:

Column 2, line 54, delete "$<1$ and $a_n - a_n' < 1$" and insert --$<<1$ and $a_n - a_n' <<1$--

Column 3, line 18, delete " + " and insert -- - --.

Column 4, line 30, delete "examplf" and insert --example--.

Signed and Sealed this

Twenty-seventh Day of September, 1994

Attest:

BRUCE LEHMAN

Attesting Officer     Commissioner of Patents and Trademarks